(12) United States Patent
Thompson

(10) Patent No.: US 7,481,439 B2
(45) Date of Patent: Jan. 27, 2009

(54) MODULAR STROLLER

(75) Inventor: Julie Tabor Thompson, Cumming, GA (US)

(73) Assignee: Hatch Design, Inc., Cary, NC (US)

( * ) Notice: Subject to any disclaimer, the term of this patent is extended or adjusted under 35 U.S.C. 154(b) by 377 days.

(21) Appl. No.: 10/570,581

(22) PCT Filed: Sep. 2, 2004

(86) PCT No.: PCT/US2004/028994

§ 371 (c)(1),
(2), (4) Date: Mar. 1, 2006

(87) PCT Pub. No.: WO2005/021351

PCT Pub. Date: Mar. 10, 2005

(65) Prior Publication Data

US 2007/0001410 A1    Jan. 4, 2007

Related U.S. Application Data

(60) Provisional application No. 60/499,410, filed on Sep. 2, 2003.

(51) Int. Cl.
*B62B 7/00* (2006.01)
*B62B 9/00* (2006.01)
*B62D 53/00* (2006.01)

(52) U.S. Cl. .............................. 280/33.991; 280/33.992; 280/47.38; 280/408; 297/232; 297/239; 297/243

(58) Field of Classification Search ............ 280/33.991, 280/33.992, 47.38, 408; 297/232, 239, 243
See application file for complete search history.

(56) References Cited

U.S. PATENT DOCUMENTS

| | | | |
|---|---|---|---|
| 4,222,132 A | | 9/1980 | Crim et al. |
| 4,805,938 A | * | 2/1989 | Redmond et al. ........ 280/47.35 |
| 4,969,656 A | | 11/1990 | Clausen |
| 5,064,209 A | * | 11/1991 | Kurschat .................... 280/204 |
| D360,392 S | | 7/1995 | Lewandowski |
| 5,653,460 A | | 8/1997 | Fogarty |
| 5,887,935 A | | 3/1999 | Sack |
| 5,918,892 A | * | 7/1999 | Aaron et al. ............. 280/47.38 |

(Continued)

FOREIGN PATENT DOCUMENTS

DE    41 33 503    4/1992

(Continued)

OTHER PUBLICATIONS

"Supplementary European Search Report," European Application No. EP 04 78 3292, Feb. 13, 2008, European Patent Office, Munich, Germany.

*Primary Examiner*—Christopher P Ellis
*Assistant Examiner*—John R Olszewski
(74) *Attorney, Agent, or Firm*—Coats & Bennett, P.L.L.C.

(57) ABSTRACT

A first and second stroller portions are described to form a modular stroller. The first and second stroller portions may be reversibly coupled together in a tandem relationship with a means for coupling to operate in a double stroller configuration. Alternatively, the first and second stroller portions may be uncoupled from one another and used in an independent mode of operation.

39 Claims, 8 Drawing Sheets

U.S. PATENT DOCUMENTS

| | | | |
|---|---|---|---|
| 6,155,592 | A | 12/2000 | Hsia |
| 6,523,840 | B1 | 2/2003 | Koppes et al. |
| 6,527,294 | B1 * | 3/2003 | Brewington et al. ........ 280/647 |
| 6,752,405 | B1 | 6/2004 | Wright |

FOREIGN PATENT DOCUMENTS

| | | |
|---|---|---|
| DE | 42 02 428 | 8/1992 |
| EP | 1 162 122 | 12/2001 |
| GB | 2 368 824 | 5/2002 |

* cited by examiner

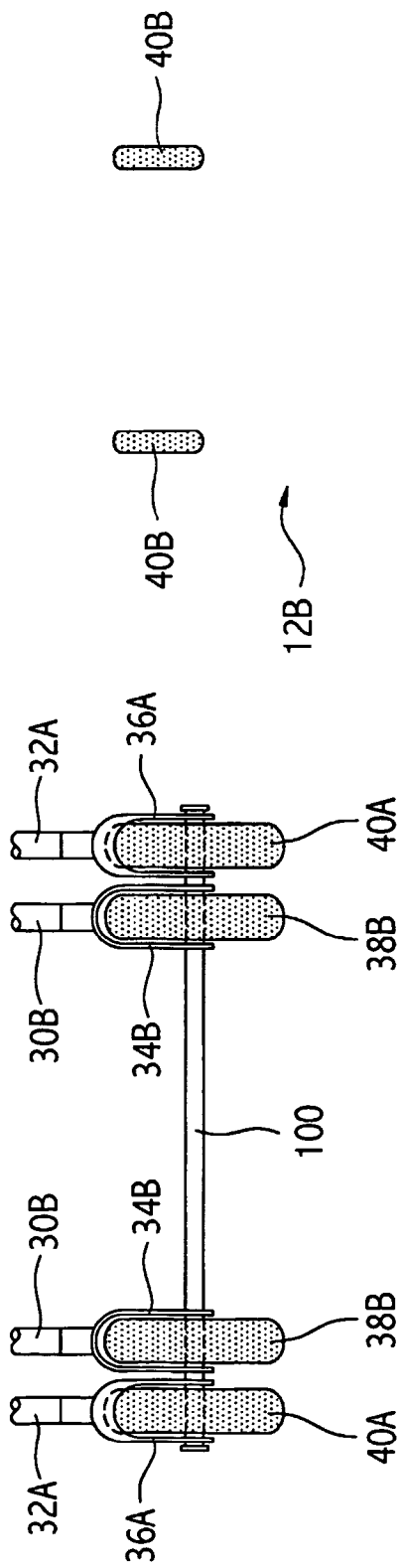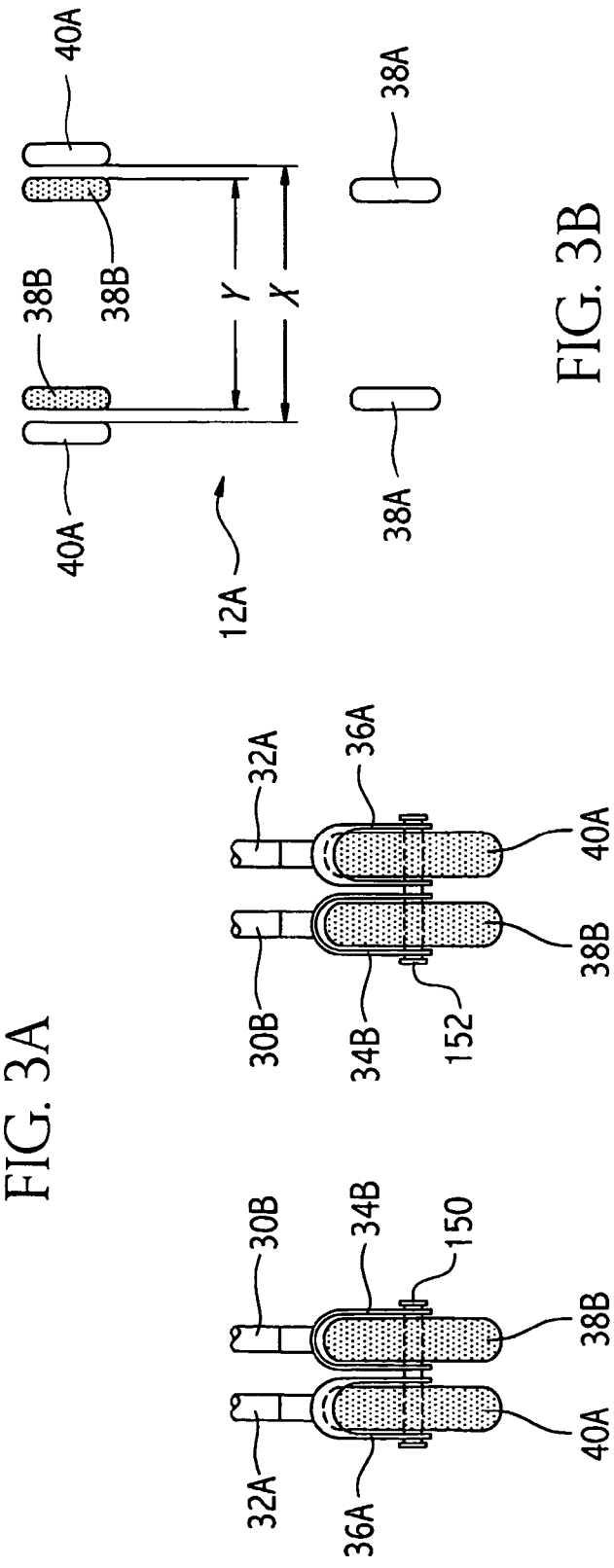
FIG. 3A  FIG. 3B  FIG. 3C

MODULAR STROLLER

This application is a national stage application of international application No. PCT/US2004/28994, filed Sep. 2, 2004, which claims priority to and the benefit of U.S. provisional patent application No. 60/499,410 filed Sep. 2, 2003.

FIELD OF INVENTION

The present invention relates to a children's stroller. Specifically, the present disclosure relates to a convertible tandem double stroller.

BACKGROUND OF INVENTION

Double, triple and quadruple strollers for transporting 2, 3 and 4 children, respectively, at the same time are available as fixed stroller arrangements wherein the two seating areas of the stroller are in side-by-side or front-to-rear ("tandem") alignment. Exemplary strollers are disclosed in U.S. Pat. Nos. 5,221,106, 3,235,279, 2,993,702, 2,857,953 and 2,789,733. While such strollers are adequate for the transport of 2, 3 and 4 children, such permanent arrangements have several drawbacks. First, since the seating areas of the strollers are permanently attached to each other, the seating portions may not be separated from one another. This is disadvantageous in the situation when the parent or other operator of the stroller only has less children to transport than seats in the double triple or quadruple stroller, as such strollers are large, heavy and difficult to steer. Furthermore, such double, triple and quadruple strollers present certain economic disadvantages. For instance, in many cases a parent with more than 1 child may have purchased a single stroller for the first child. With the arrival of a second (or third, fourth, etc.) child and the purchase of a double, triple or quadruple stroller, the single stroller is no longer required.

It would therefore be advantageous if a stroller could be provided that could be adapted to transport a variable number of children depending on the needs of the parent or other operator. For instance, a double stroller could be provided that could alternate between the double stroller configuration and a single stroller configuration when desired. The present disclosure provides such stroller comprising a first stroller portion adapted to be reversibly coupled to a second stroller portion. The first and second stroller portions may be reversible coupled together for operation as a unit (such as, but not limited to, a double stroller) or the first and second stroller portion may be uncoupled and used separately. The first and second stroller portions could each be a single stroller or could each be a double stroller. Further more, one of the first or second stroller portions could be a single stroller, while the other of the first or second stroller portions could be a double stroller. Such a stroller, with the features described herein, was not heretofore available in the art.

BRIEF DESCRIPTION OF THE DRAWINGS

The invention will be better understood by reference to the accompanying drawings and the following detailed description wherein:

FIG. 3A is a front perspective view of the rear wheels of the first stroller portion in alignment with the front wheels of the second stroller portion;

FIG. 3B is a perspective view of the wheel placement and the relative wheel span of the first and second stroller portions when stroller is configured in the tandem mode.

FIG. 3C is a front perspective view of the rear wheels of the first stroller portion in alignment with the front wheels of the second stroller portion;

DETAILED DESCRIPTION OF THE INVENTION

Figure 1:
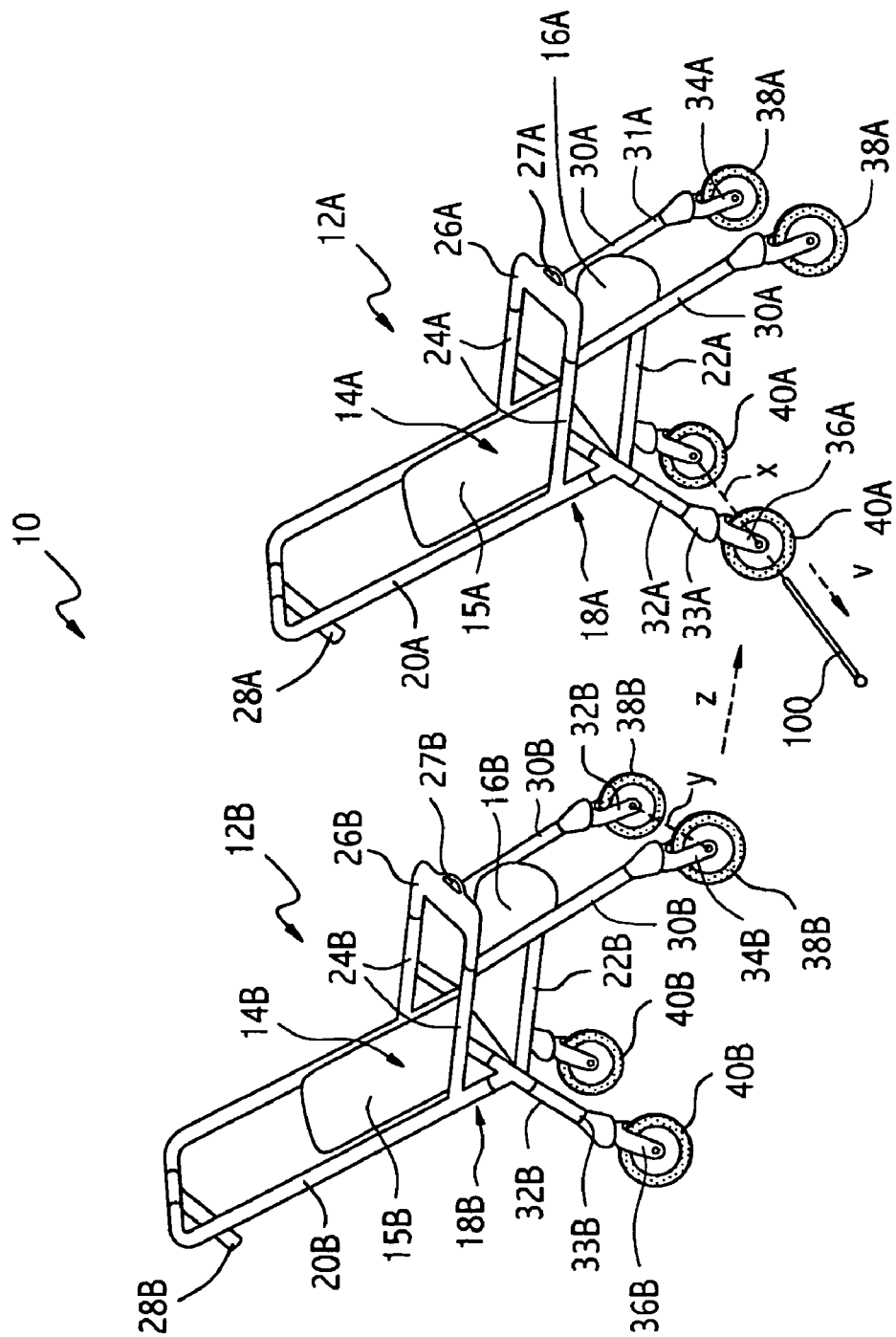
FIG. 1 is a side perspective view of the first and second stroller portions prior to alignment of the first and second stroller portions.

The present disclosure provides a modular stroller capable of adapting between multiple configurations comprising a first stroller portion adapted to be reversibly coupled to a second stroller portion. The first and second stroller portions may be reversible coupled with one another by a means for coupling when it is desired to operate the first and second stroller portions in a multiple stroller configuration, such as, but not limited to, a double stroller. The first and second stroller portions could each be a single stroller or could each be a double stroller. Further more, one of the first or second stroller portions could be a single stroller, while the other of the first or second stroller portions could be a double stroller. Therefore, the multiple configurations of the stroller described can be a double stroller, a triple stroller, or a quadruple stroller depending on the choice of the first and second stroller portions. As described below, the means for coupling the first and second stroller portions allows for ease of maneuverability when the first and second stroller portions are coupled together. The means for coupling is applicable regardless of whether the first and second stroller portions are single or double strollers. The operation of the described stroller in a multiple configuration allows a parent or other user of the stroller to transport from 1 to four children depending on the needs of the situation.

Alternatively, by virtue of the reversible coupling, the first and second stroller portions may be uncoupled from one another so that the first and second stroller portions may be independently operated as single units. Independent operation of the first and second stroller portions maybe used when two parents or other users are present to operate the first and second stroller portions, or when only 1 child is present and thus only 1 stroller is required. Such independent operation of the first and second stroller portions is advantageous in many situations. For example, the independent operation of the first and second stroller portions allows for easier manipulation and maneuverability since only one of the stroller portions is in operation. Furthermore, in many cases it maybe advantageous for two users of the described double stroller to tend to separate tasks (such as may occur when shopping or attending to other errands). The independent operation of the first and second stroller portions allows the users to each take one child and tend to a specific task. Finally, the children being transported may simply desire to have their "own" stroller or to sit in the front, and the ability of the first and second stroller portions to operate in both a coupled configuration and an independent configuration allows a parent to satisfy such a desire.

In one embodiment, the first and second stroller portions are coupled to one another by aligning the front wheels of the second stroller portion with the rear wheels of the first stroller portion such that the front wheels of the second stroller portion fit inside the distance between the rear wheels of the first stroller portion. Such an arrangement is made possible by providing a spacing between the rear wheels of the first stroller portion that is slightly wider than the spacing between the front wheels of the second stroller portion. As is obvious, the configuration may be reversed if desired with the rear wheels of the first stroller portion fitting inside the distance between the front wheels of the second stroller portion. Once such an alignment is achieved, the first and second stroller portions are reversibly coupled together by a means for coupling. In one embodiment, the means for coupling is a rod that is inserted into a hollow axle portion of the front wheels of the second stroller portion and a hollow axle portion of the rear wheels of the first stroller portion. In an alternate embodiment, the rear wheels of the front stroller portion may contain a spring loaded rod or nub which is reversible received in a receiving hole on the front wheels of the rear stroller portion (as is obvious such a configuration could be reversed if desired). In yet another alternate embodiment of the means for coupling, the front wheels of the rear stroller portion could comprise securing rod or nub which are received by a receiving aperture or flanges located on the rear wheels of the first stroller portion (as is obvious such a configuration could be reversed if desired).

The reversible coupling of the first and second stroller portions provides a pivot point for the stroller when operated in the coupled mode which is located at the mid section of the tandem stroller. In prior art strollers, for example a double stroller, the position of the rear wheels served as the pivot point. The placement of the pivot point farther away from the handle portion of the described double stroller provides more leverage and results in a double stroller that is easier to turn and one having a smaller turning radius.

The described stroller is also more cost efficient than prior art double, triple or quadruple strollers. By purchasing the described stroller, the parent or other user obviates the need to first purchase a single stroller for the first child and then purchase an additional stroller(s) for the subsequent child/children. Since the first and second stroller portions can be operated independently, the described first and second stroller portions could be purchased initially and the second stroller portion used when the need arises. Alternatively, the first and second stroller portions could be provided as individual units to a consumer, allowing the consumer to purchase the first stroller portion initially and then purchase the second stroller portion when the need arises. In this embodiment the means for coupling could be provided with each stroller respectively (if the means for coupling contained complementary or matching elements), or with the purchase of the second stroller portion or the means for coupling could be provided as a separate unit itself.

As is obvious, such an adaptable stroller configuration will provide a user with greater versatility and convenience. The means for coupling connecting the front wheels of the second stroller portion to the rear wheels of the first stroller portion may be easily and quickly removed when it is desired to use the first and second stroller portions independently. As will be described below, the means for coupling may be stored in or on one of the first or second stroller portions when not in use, or the means for coupling may simply be replaced in one of the first or second stroller portions in the same manner as if the means for coupling was in use in reversibly coupling the first and second stroller portions together. In certain embodiments described herein, the means for coupling does not involve removal of parts from the stroller and therefore no storage is required.

In addition, an adjustable handle is provided on at least one of the first or second stroller portions. This adjustable handle, in combination, with the pivot point location at the center of the described stroller in coupled mode, makes one handed steering and operation of the described double stroller possible. The first and second stroller portions described herein may also be provided with accessories common in the art for protecting and entertaining the child. For example, a rotating awning attached to the arms of the first and/or second stroller portions may provides greater coverage from the sun than awnings attached at the seat-back. For entertainment, a toy bar can be connected to the underside of the awning or to other components of the first or second stroller portions.

Figure 2:
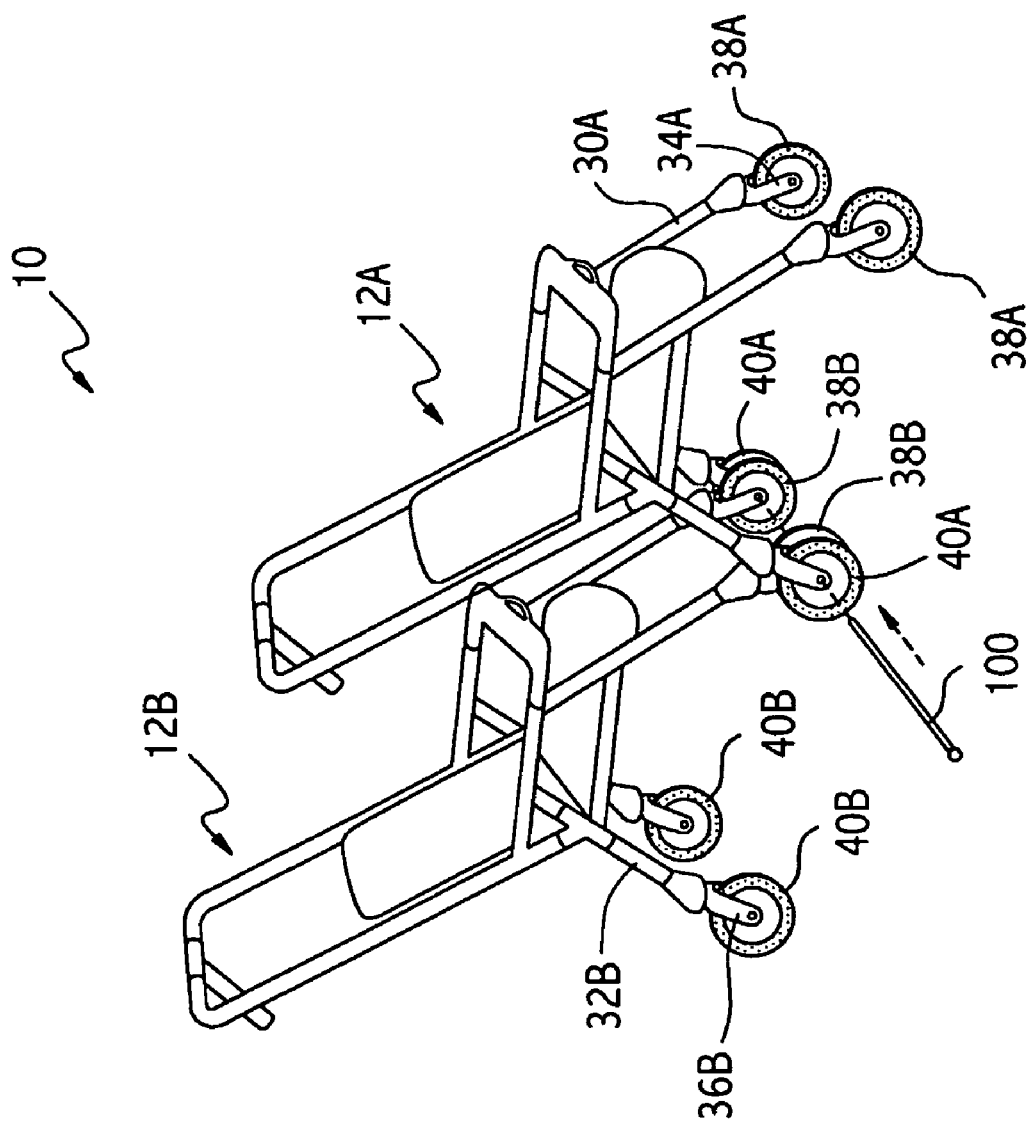
FIG. 2 is a side perspective view of the first and second stroller portions after alignment of the first and second stroller portions.

In the discussion below, reference is made to an embodiment of the described stroller where the first and second stroller portions are single strollers and the stroller in a coupled configuration is a tandem, double stroller. However, as described above, the first and second stroller portions could each be double strollers or a combination of a single stroller and a double stroller and the described elements would operate in a similar manner. Likewise the first stroller portion could be a single stroller and the second stroller portion could be a double stroller (or vice versa). Referring to the figures, where like reference numbers refer to like elements, a reversibly-coupled double stroller 10 is illustrated. In FIGS. 1 and 2, the double stroller 10 is illustrated and comprises a first stroller portion 12A and a second stroller portion 12B. The general configuration of the first 12A and second 12B stroller portions is essentially identical except as specifically stated herein and the elements thereof are referred to by the same reference numerals, with the suffix "A" referring to the first stroller portion 12A and the suffix "B" referring to the second stroller portion 12B. FIG. 1 shows the first 12A and second 12B stroller portions separate from one another before reversible coupling, with the arrow Z showing the direction of movement of the second stroller portion 12B so that the second stroller portion 12B can be aligned with the first stroller portion 12A for coupling to the first stroller portion 12A. The general configuration of the first stroller portion 12A will now be described, with the realization that the second stroller portion 12B contains like elements with like designations ending in the suffix "B".

The first stroller portion 12A comprises a seating area 14A supported by a frame 18A. The frame 18A comprises an upper frame portion 20A, a lower frame portion 22A at least one front wheel strut 30A and at least one rear wheel strut 32A, with all the components being in communication with one another. The front 30A and rear 32A wheel struts may further comprise a front wheel fork 34A and a rear wheel fork 36A, respectively, to support front 38A and rear 40A wheels. The seating area 14A comprises a backrest 15A and a seat 16A with appending leg rests and footrests supported by the upper 20A and lower 22A frame portions. The frame 18A may further comprise two armrest 24A coupled to the frame 18 (in the embodiment shown the armrest 24A is secured to the upper frame portion 20A). The exact configuration of the frame 18A and its components is not critical to the present disclosure as many variations may be considered within the scope of the disclosure and will not impact the operation of the described modular stroller. The specific embodiment illustrated is given by way of example of one possible configuration and should not be considered as limiting the appended claims in scope. Other arrangements of these elements are possible without departing from the spirit on the present disclosure. The armrest 24A may have a tray/bar 26A located at the front portion thereof. The tray 26A may be pivotally secured to one side of the armrest 24A and reversible secured to the opposite side of armrest 24A to allow the tray 26A to be raised and lowered, thereby facilitating placement of a child in the seating area 14A. The tray 26A may further comprise a cutout portion 27A to allow a user to grasp the first stroller portion 12A when needed. The cutout portion 27A may be conveniently shaped to conform to the contours of the user's hand. The upper end of the frame portion 20A is provided with an adjustable guiding handle 28A.

The frame 18A also comprises at least one front wheel strut 30A and at least one rear wheel strut 32A (in FIGS. 1 and 2, two front wheel struts 30A and two rear wheel struts 32A are illustrated). The exact configuration of the attachment of the wheel struts 30A and 32A to the frame 18A and the armrest 24A is not critical to the present disclosure, with the embodiment shown being for illustrative purposes only. Other arrangements are possible without departing from the spirit on the present disclosure. Each of the front 30A and rear 32A wheel struts have a lower end 31A and 33A, respectively, which is coupled to a front wheel fork 34A and a rear wheel fork 36A, respectively. Each of the front 34A and rear 36A wheel forks support and secure at least one front wheel 38A and at least one rear wheel 40A, respectively (alternatively, each of the front 34A and rear 36A wheel forks may support and secure two front wheels 38A and two rear wheels 40A, respectively).

FIG. 2 shows the first stroller portion 12A and the second stroller portion 12B in an aligned position required for coupling first stroller portion 12A to the second stroller portion 12B. As shown in FIGS. 1 and 3B, the distance X between the two rear wheels 40A of the first stroller portion 12A is slightly greater than the distance Y between the two front wheels 38B of the second stroller portion 12B. This allows the front wheels 38B of the second stroller portion 12B to be positioned inside the rear wheels 40A of the first stroller portion 12A. FIG. 2 also illustrates one embodiment of the means for coupling, which in FIG. 2 is illustrated as a rod 100. Other means for coupling may also be used as described herein.

To reversible couple the first 12A and second 12B stroller portions in tandem, the rod 100 is removed from the rear axle portions 35A (see FIGS. 4A and 4B) of first stroller portion 12A (where it may be stored when the first stroller portion 12A is operated in an independent manner) as indicated by the arrows V in FIG. 1. The second stroller portion 12B is pushed forward so that the front wheels 38B of the second stroller portion 12B are aligned with the rear wheels 40A of the first stroller portion 12A as shown in FIG. 2. As discussed above, the distance X between the two rear wheels 40A of the first stroller portion is slightly greater than the distance Y between the two front wheels 38B of the second stroller portion 12B, allowing the front wheels 38B to be positioned inside of rear wheels 40A. In an alternate embodiment, the distance X between the two rear wheels 40A of the first stroller portion may be slightly less than the distance Y between the two front wheels 38B of the second stroller portion 12B. In this embodiment, the rear wheels 40A are positioned inside the front wheels 38B (in this embodiment, the means for coupling such as rod 100 would be stored in the second stroller portion 12B). Once the wheels 40A and 38B are aligned as described, the rod 100 is inserted into the rear axle 35A and front axle 35B of the rear 36A and front 34B wheel forks, respectively, as illustrated in FIG. 2. In this manner the first 12A and second 12B stroller portions are reversibly coupled together in the tandem configuration and function as a unit. In this embodiment, the rear axles 35A of the first stroller portion 12A and the front axles 35B of the second stroller portion 12B are hollow to accommodate the rod 100. The rear axles 35A of the first stroller portion 12A and the front axles 35B of the second stroller portion 12B, however, need not be hollow as certain embodiments of the means for coupling do not require hollow axle portions (it should be noted that in these alternate embodiments, the axle portions may be hollow if desired).

FIG. 3A illustrates one embodiment of the alignment of the rear wheels 40A of the first stroller portion 12A and the front wheels 38B of the second stroller portion 12B. As can be seen, the front wheels 38B of the second stroller portion 12B are positioned inside of the rear wheels 40A of the first stroller portion 12A. Rod 100 is illustrated as the means for coupling as discussed above. FIG. 3B is a plan view showing the alignment of all 8 wheels of the first 12A and second 12B stroller portions (rod 100 is omitted in FIG. 3B for clarity). In FIG. 3B, the hatching on the wheels designates the wheels of the second stroller portion 12B (40B and 38B) while the wheels without hatching designate the wheels of the first stroller portion 12A (40A and 38A). As can be seen in FIG. 3B, the front wheel span Y of the front 12A and rear 12B stroller portions is narrower than the back wheel span X of the front 12A and rear 12B stroller portions. In this embodiment, the first 12A and second 12B stroller portions are interchangeable. Alternatively, the front wheel span Y of the first stroller portion 12A may be the same as the rear wheel span X of the first 12A and second 12B stroller portions. In this embodiment, the first 12A and second 12B stroller portions are not interchangeable.

Although the rod 100 is illustrated as a single rod spanning the entire wheel span X and extending through the hollow axles 35A and 35B of each of the rear 36A and front 34B wheel forks, the rod 100 may comprise two shorter rods. Each of the rods secure one set of wheel forks and their attached wheels. For example, in reference to FIG. 3C, Rod 150 may be inserted through the hollow axles 35A and 35B of a first set rear 36A and front 34B wheel forks to secure said first set of wheel forks (and their associated wheels 40A and 38B), while a second rod 152 may be inserted through the hollow axles 35A and 35B of the second set of rear 36A and front 34B wheel forks to secure said second set of wheel forks (and their associated wheels 40A and 38B). The securing mechanisms described below are applicable to rod 100, as well as the rods 150 and 152.

Figure 4C:
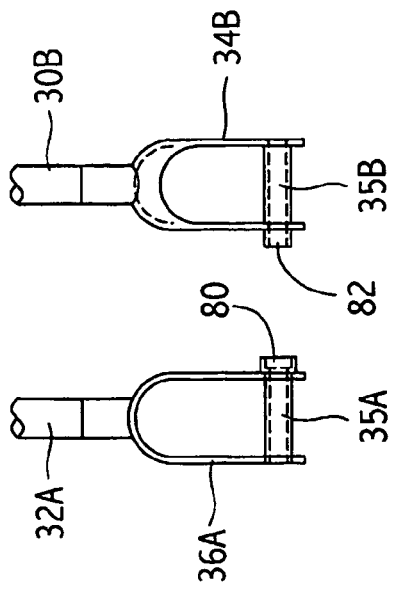
FIG. 4C illustrates one embodiment of an alignment mechanism to aid in the alignment of the first and second stroller portions prior to reversible coupling, illustrating the components of such alignment mechanism independently.
Figure 4D:
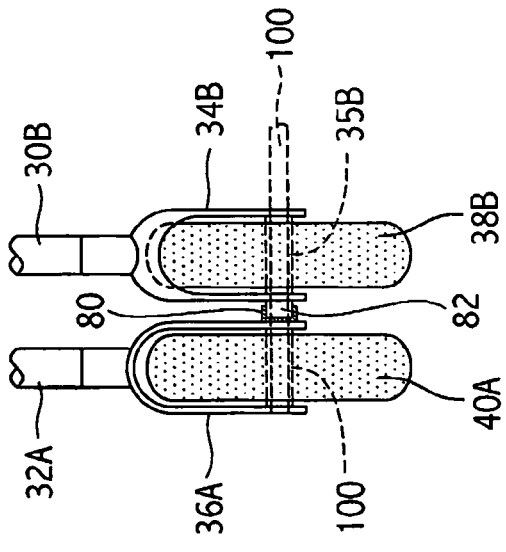
FIG. 4D illustrates the embodiment of an alignment mechanism shown in FIG. 4C, but illustrating the components of the alignment mechanism in an aligned configuration.
Figure 4A:
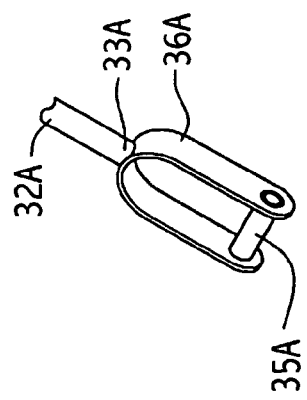
FIG. 4A is a perspective view of a wheel fork and hollow axle without a wheel attached.
Figure 4B:
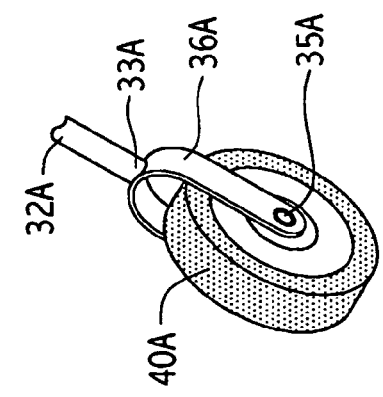
FIG. 4B is a perspective view of a wheel fork and hollow axle with a wheel attached.

FIGS. 4A and B show a detailed view of one of the configuration of the wheels. In this figure, the rear wheel fork 36A of the first stroller portion 12A is illustrated for convenience, it being understood that similar elements are of similar construction. FIG. 4A shows the wheel fork 36A without the rear wheel 40A and shows the axle portion 35A (which are illustrated as hollow) which receives the rod 100 (or rods 150 or 152). The axle 35A is an integral part of the fork 36A and the wheel 40A. FIG. 4B shows the rear fork 36A with the wheel 40A. The rear fork 36A is secured to the lower end 33A of the rear wheel strut 32A by means standard in the art. The rear wheel strut 32A is secured to the frame 18A as discussed above. The exact configuration of how the rear wheel strut 32A and the front wheel strut 30A are secured to the frame 18A is not critical and many variations maybe envisioned and fall within the teachings of the disclosure. The wheel forks maybe pivotally secured to the wheel struts so that the wheel forks and attached wheels may pivot during use. Furthermore, the wheel forks may be equipped with a device to reversible switch the wheel forks between a swivel mode where the wheel forks and attached wheels may pivot/swivel during use and anon-swivel mode where the wheel forks and attached wheels do not pivot during use. Such devices are known in the art.

FIGS. 4C and 4D illustrate an alignment mechanism to aid in the alignment of the first 12A and second 12B stroller portions. As shown in FIGS. 4C and 4D, in one embodiment, a catch mechanism for easy alignment of the first 12A and second 12B stroller portions in a tandem position is illustrated. In this embodiment, one or both of the axles 35B of the front wheel forks 34B of the second stroller portion 12B is provided with an axle tube extension 82. One or both of the axles 35A on the rear wheel forks 36A of the first stroller portion 12A are provided with an axle catch 80. The axle catch 80 extends at least partially around the circumference of the axle 35A and is configured to engage the axle tube extension 82. As illustrated in FIGS. 4C and 4D, the axle catch 80 extends from the interior side of the axles 35A and the axle tube extension 82 extends from the exterior side of the axles 35B. In this manner, the axle catch 80 and the axle tube extension 82 come into contact with one another when the second stroller portion 12B is aligned with the first stroller portion 12A as described above. When the second stroller portion 12B is pushed forward to align with the first stroller portion 12A for reversible coupling, the axle catch 80 on the first stroller portion 12A will engage the axle tube extension 82 on the second stroller portion 12B and prevent the second stroller portion 12B from passing the alignment point. This allows the easier insertion of the means for coupling, such as rod 100. Furthermore, the axle catch 80 may further comprise a hinged cover to secure the axle tube extension 82 within the axle catch 80 and therefore serve as a means for coupling. As is obvious, the second stroller portion 12B may be equipped with the axle catch 80 and the first stroller portion 12A may be equipped with the axle tube extension 82, with the placement and operation being as described above.

Figure 5B:
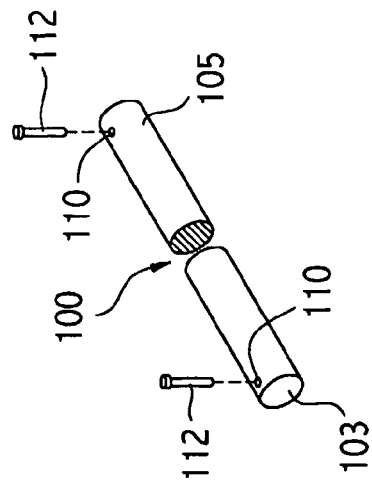
FIG. 5B is a perspective of an alternate embodiment of the means for coupling.
Figure 5C:
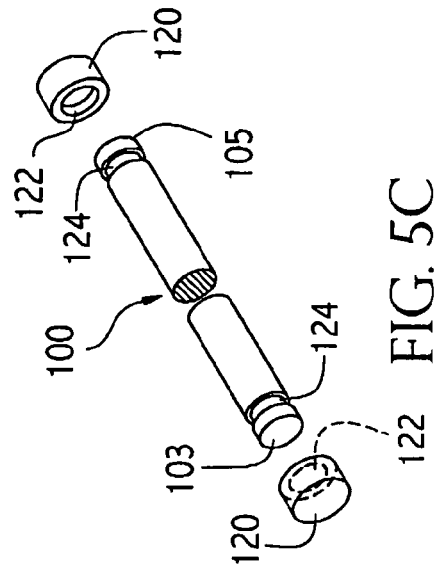
FIG. 5C is a perspective of an alternate embodiment of the means for coupling.

The means for coupling is adapted to be reversibly secured within the hollow axle portions 35A of the rear wheel fork 36A of the first stroller portion 12A and the hollow axle portion 35B of the front wheel fork 34B of the second stroller portion 12B by a securing device. In this manner the reversibly coupling of the first 12A and the second 12B stroller portions will be secure during use of the stroller 10 when used in the tandem configuration. Several of these embodiments are illustrated in FIGS. 5A-5C (with the means for coupling being illustrated as rod 100).

Figure 5A:
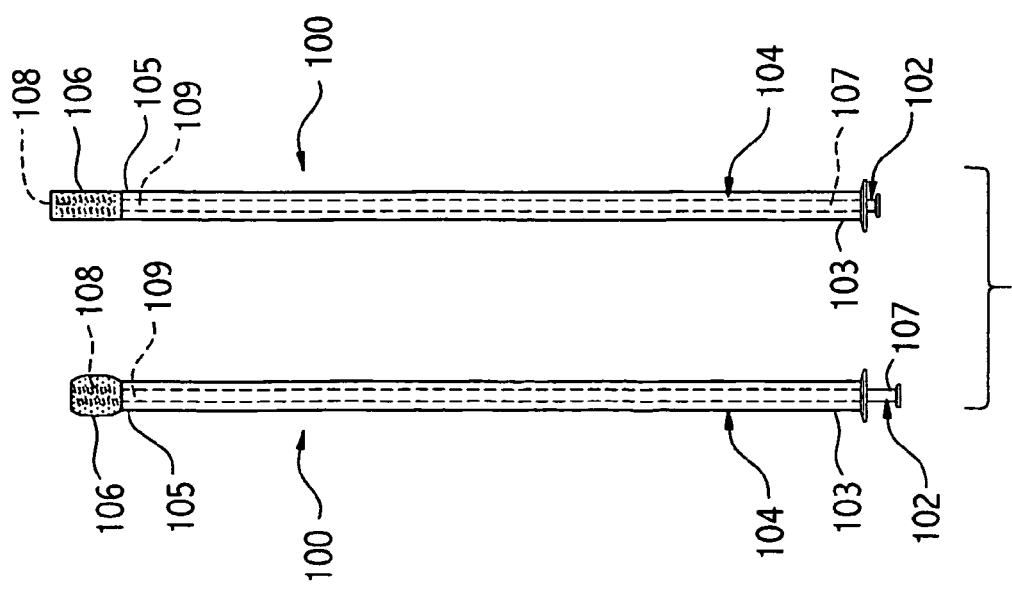
FIG. 5A is a perspective view of one embodiment of the means for coupling.

Referring to FIG. 5A, the rod 100 is shown comprising an inner rod 102 within a hollow outer rod 104. The outer rod 104 has a first end 103 and a second end 105 and the inner rod 102 has a first end 107 and a second end 109. The first end 103 of the outer rod 104 is open, allowing depression of the inner rod 102. The second end 105 of the outer rod 104 comprises an expandable member 106 and a biasing means 108 (such as, but not limited to, a spring or lever). The biasing means 108 is in communication with the expandable member 106 and with at least one of the inner 102 or outer 104 rods, such that the biasing means 108 and the inner rod 102 allows the expandable member to alternate between a first position and a second position depending on the position of the inner 102 and outer 104 rods. The second position allows the rod 100 to be inserted through the axle portions of the first 12A and second 12B stroller portions as the biasing means 108 applies a force on the expandable member 106 causing the expandable member 106 to adopt an extended, narrow conformation. The first position allows the rod 100 to be maintained in the axle portions of the first 12A and second 12B stroller portions as the biasing means 108 applies a force on the expandable member 106 causing the expandable member 106 to adopt a contracted, bulbous conformation. To remove the rod 100, the relative position of the inner 102 and outer 104 rods is simply reversed. Other embodiments are possible to achieve compression of expandable member 106 (other spring locations, lever(s) instead of springs, etc.) and should be considered within the scope of the present disclosure.

In an alternate embodiment (illustrated in FIG. 5B), the rod 100 (which may be hollow or solid in this embodiment) is fitted with a pair of aligned holes 110 on at least one of the first 103 and second 105 ends. The holes 110 receive a securing pin 112. To reversible couple the first and second stroller portions together, the rod is placed through the hollow axle portions 35A of the rear wheel fork 36A of the first stroller portion 12A and the hollow axle portion 35B of the front wheel fork 34B of the second stroller portion 12B. After insertion is complete, the securing pin 112 is placed through the holes 110. The securing pin 112 may have a compressible knob, protrusion or like device which is compressed during insertion or removal of the pin 112 through holes 110 but which extends once insertion or removal is complete, thereby ensuring the pin 112 will remain in place. To remove the rod 100, the operation is simply reversed. The pin 112 may be secured to the first 12A or second 12B stroller portion, such as by a wire, to prevent the pin 112 from being misplaced.

In yet another alternate embodiment (illustrated in FIG. 5C) at least one of the first 103 or second 105 ends of the rod 100 are fitted with mating elements that interacts with a complementary mating element on a cap or similar device. Such complementary mating elements may interact by a snap-fit friction arrangement or by a threaded screw arrangement as each is known in the art. For example, FIG. 5C illustrates a cap 120 on with a central opening 122 to receive the rod 100 (or rods 150/152). The cap 120 may be placed on the outer side of the hollow axle 35A of the rear wheel fork 36A of the first stroller portion 12A or may be a separate element. The central opening 122 maybe slightly smaller than the diameter of the rod 100 (or rods 150/152). Located adjacent to the second end 105 of the rod 100 (or similar location on rods 150/152) is a recessed portion 124 which extends at least partially around the diameter of rod 100. As the rod 100 passes through the central opening 122, the cap 120 expands slightly since the central opening is slightly less than the diameter of the rod 100. However, as recessed portion 124 passes through the central opening 122, the cap 120 snaps into the recessed portion 124 and is secured therein by friction. In this manner the rod 100 is secured. To remove the rod 100, the rod 100 may be pushed or pulled such that the portion of the cap adjacent to the central opening 122 is disengaged from the recess 124, thus allowing the rod 100 to be removed. If the cap 120 is a separate element, the cap may be simply removed; in this case the cap 120 may be secured to the first 12A or second 12B stroller portions to prevent the cap 120 from being misplaced.

Figure 6A:
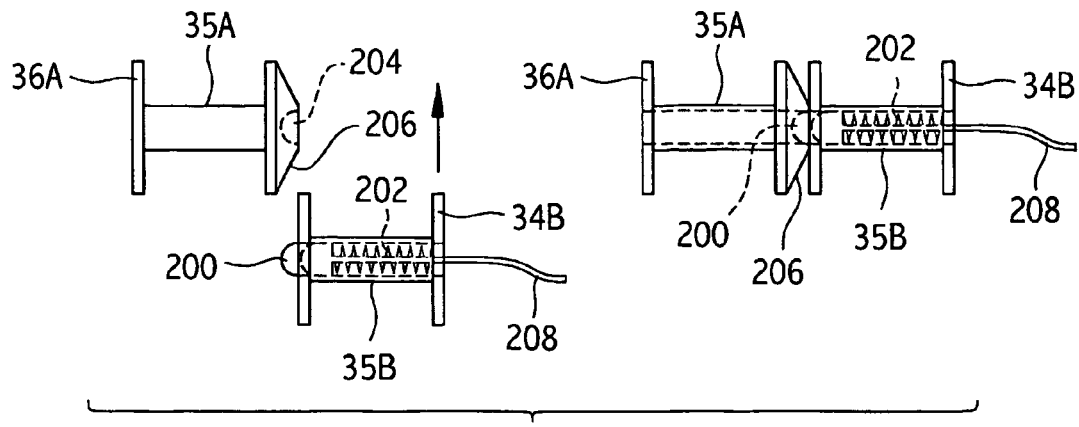
FIG. 6A is a front view of an alternate embodiment of the means for coupling.

Still another embodiment of the means for coupling is shown in FIG. 6A. In this embodiment, a retractable element is located in conjunction with the axle portion 35A or 35B of one of the first 12A or second 12B stroller portions and a receiving aperture is located in conjunction with the axle portion 35A or 35B of the other. The retractable element is received by the receiving aperture to reversible couple the first 12A and second 12B stroller portions. The axle portions 35A or 35B may be solid, hollow or partially hollow as desired and as required to accommodate the elements described. The retractable element may be of any shape or design and the receiving aperture can be of any configuration to receive the retractable element. In one embodiment, the retractable element is a retractable pin 200 located on at least one of the axles 35B of the second stroller portion 12B. The retractable pin 200 may be biased by a spring 202 (which would bias the retractable pin to the extended position). Both the pin 200 and the spring 202 may be partially or fully contained in the hollow portion of axle portion 35B. The pin can alternate between an extended and a retracted position by engaging a button, lever, cord/line/wire (collectively referred to as a cord) or similar mechanism (referred to collectively as the alternating mechanism). The alternating mechanism may be located at any convenient location on the first or second stroller portions. As a specific example, the alternating mechanism may be a cord 208 attached to the retractable pin 200. As the cord 208 is pulled, the retractable pin 200 moves to the retracted position; when the cord 208 is released, the retractable pin 200 returns to the extended position. The cord 208 may be actuated by a lever, dial switch or similar device (not shown) as is known in the art. The lever, dial switch or similar device may be located at any convenient location on the first 12A or second 12B stroller portions. The mechanism by which the retractable pin 200 is alternated between the extended and retracted positions can be varied and is not critical to the present disclosure. A receiving aperture 204 is located on the interior portion of at least one of the axles 35A on the rear wheel strut 36A of the first stroller portion 12A. The receiving aperture 204 may have sloped edges 206 to aid in receiving the retractable pin 200 through the compression of retractable pin 200 as it makes contact with the edge 206. As the retractable pin 200 clears edge 206, the retractable pin 200 is forced into aperture 204 by action of the compressed spring 202. Alternatively, the wheel fork 34B may be adapted to contain the receiving aperture. As the first 12A and second 12B stroller portions are aligned, the retractable pin engages the sloped portions 206 of the receiving aperture 204 and is urged towards the retracted position until the retractable pin 200 enters the receiving aperture 204 at which point the first 12A and second 12B stroller portions are coupled together. When desired to uncouple the first 12A and second 12B stroller portions, the cord 208 is engaged to pull the retractable pin to the retracted position, allowing the uncoupling step. Alternatively, before the first 12A and second 12B stroller portions are aligned, the cord 208 (or other alternating mechanism) is engaged to place the pin 200 in the retracted position. Once the first 12A and second 12B stroller portions are aligned (with the aid of the alignment mechanism, if desired) the alternating mechanism is engaged to place the pin 200 in the extended position so that the pin 200 interacts with the receiving aperture 204. In this manner the first 12A and second 12B stroller portions are coupled together. To uncouple the first 12A and second 12B stroller portions the operation is simply reversed. As would be obvious, the locations of the retractable pin 200 and the receiving aperture 204 may be reversed if desired.

Figure 6B:
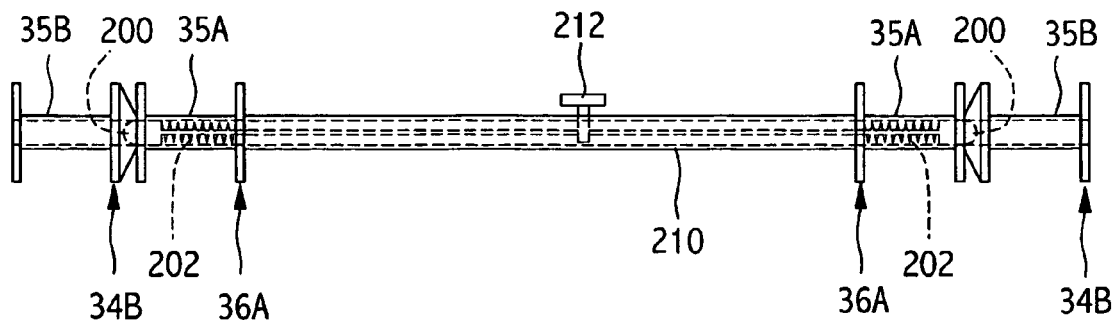
FIG. 6B is a front view of an alternate embodiment of the means for coupling.

FIG. 6B illustrates an additional embodiment of the means for coupling. In this illustration, the rear wheels 40A of the first stroller portion 12A fit inside the front wheels 38B of the second stroller portion 12B. In FIG. 6B a rod 210 extends between the rear wheels 40A of the first stroller portion 12A. The axle 35A of one or both of the rear wheels 40A is at least partially hollow to contain a retractable element, such as, but not limited to, retractable pin 200. Either one or both of the axle portions 35A of the rear wheels 40A may contain a retractable element. In an alternate embodiment, the retractable element may be contained in at least one end of the rod 210 and simply extend through the partially hollow axle portion 35A of the rear wheels 40A. Regardless of the placement of the retractable element, the retractable element is of a sufficient length and size that the retractable element is securely received by the receiving aperture 204. A rigid cord/ line/lever or similar device (not shown) in communication with and secured to the retractable pin 200 is secured to and in communication with a lever 212. As the lever 212 is rotated, tension is applied to the cord and the cord and pin 200 are pulled to place the retractable pin 200 in the retracted position. The first 12A and second 12B stroller portions may then be aligned as described above and the lever 212 rotated so that retractable pin is returned to the extended position and engages the receiving aperture 204, which in this embodiment is located on the interior side of the front wheels 38B of the first stroller portion 12A (the receiving aperture may also be located on the wheel strut if desired). The retractable pin 200 may extend into the axle portion 35B of the front wheels 38B of the second stroller portion if desired. As would be obvious, if the front wheels 38B of the second stroller portion 12B fit inside the rear wheels 40A of the first stroller portion 12A, the configuration described above may be reversed.

Figure 6C:
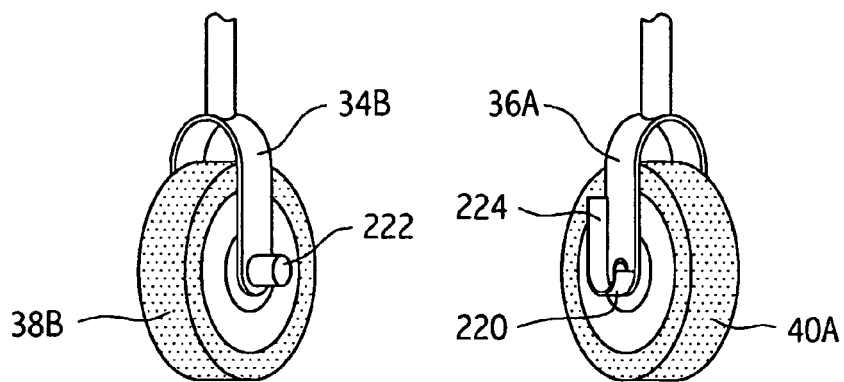
FIG. 6C is a front view of an alternate embodiment of the means for coupling.

Still another embodiment of the means for coupling is shown in FIG. 6C. In this embodiment, one or both of the axles 35A of the first stroller portion 12A are provided with a receiving latch 220. The receiving latch 220 extends at least partially around the circumference of the axle 35A and is configured to engage the axle nub which extends from the axle 35B of the front wheel fork 34B of the second stroller portion 12B. As described above for FIGS. 6A and 6B, the axle portions 35A or 35B may be solid, hollow or partially hollow as desired and as required to accommodate the elements described. The receiving latch 220 may be substantially U-shaped and of sufficient depth to ensure that the receiving latch 220 securely receives the axle nub 222. Alternatively, the receiving latch 220 may be having one side of the U-shape extend above the other side so as to provide a stop 224 for the axle nub 222 and make placement of the axle nub 222 in the receiving latch 220 more efficient. The receiving latch 220 may also have a wider opening at top to aid in easy placement. The receiving latch 220 is shown located on the interior side of the axles 35A of the first stroller portion 12A and the axle nub 222 is shown located on the exterior side of the axles 35B of the second stroller portion 12B. In this manner, the receiving latch 220 is in a position to receive the axle nub 222. In operation, the second stroller portion 12B is tilted slightly so that the front wheels 38B are slightly off the ground. The second stroller portion 12B is then pushed forward so that the axle nub 222 is located over the receiving latch 220 (the alignment may be aided by stop 224 on the receiving latch 220). When in this position, the second stroller portion 12B is lowered from the tilted position so that the axle nub 222 rest inside the receiving latch 220. In this manner the first 12A and second 12B stroller portions are reversible coupled. In this configuration, the front wheels 38B of the second stroller portion 12B are resting on the ground. As is obvious, the second stroller portion 12B maybe equipped with the receiving latch 220 and the first stroller portion 12A may be equipped with the axle nub 222, with the placement and operation being as described above. The receiving latch 220 may further comprise a hinged cover to further secure the axle nub 222 in the receiving latch 220. The hinged cover may be hingedly attached to either leg of the receiving latch 220 shown in FIG. 6C.

A securing strap may also be used in combination with any of the embodiments of the present disclosure to further secure the first and second stroller portions to one another. The securing strap may be removably connected to both the first and second stroller portions or may be secured to one of the first or second stroller portions and be removably connected to the other of the first or second stroller portions.

In addition to the other embodiments described, the means for coupling may be a bar secured to both the first 12A and second 12B stroller portions. The bar(s) may be permanently attached to one of the first 12A or second 12B stroller portions and reversible attached to the other. Alternatively, the bar(s) could be reversible attached to both the first 12A and second 12B stroller portions. The secure attachment of the bar(s) to either stroller portion 12A or 12B may be accomplished by a pivotal attachment such that the bar(s) may be moved to a convenient position when not in use. The reversible attachment may be accomplished by hooks, clamps and similar devices. The bar(s) may attach to any part of the frame 18A or 18B of the first and second stroller portions. Furthermore, the bar(s) may be at least partially collapsible so that the bar may be stored more conveniently when not in use. Such a collapsible bar(s) may be a telescoping bar, as is known in the art.

Figure 7A:
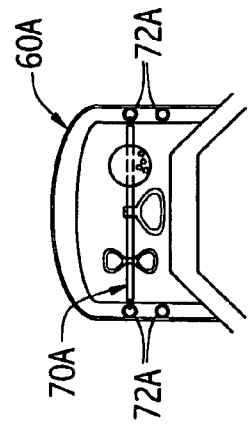
FIG. 7A is a top perspective view of one embodiment of the tray portion of the stroller.
Figure 7B:
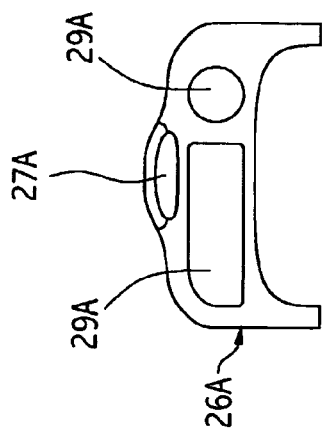
FIG. 7B is a side view of one embodiment of the stroller described showing the reversible engagement of the arm portion.

Referring to FIGS. 7A and 7B, the tray is shown in greater detail. For simplicity, reference will be made to tray 26A of the first stroller portion 12A, with the understanding that the tray 26B of the second stroller portion 12B is of similar design. The tray 26A may have an arrangement of recesses, designated 29A, as is known in the art. Such an arrangement may be advantageous as it allows the child an area to place a bottle, juice cup or similar item. Furthermore, the tray 26A may comprise a cutout portion 27A to allow a user to grasp the first stroller portion 12A when needed. The cutout portion 27A may be conveniently shaped to conform to the contours of the user's hand. The cutout portion 27A may have a rubber grip. As shown in FIG. 7B, the tray 26A may be secured to a bar 54A by means known in the art. The bar 54A is pivotally secured to one of the armrests 24A at point 23A, but is reversible secured to the opposite armrest 24A by a latch mechanism 25A (which operates as is known in the art). This allows the tray 26A to be raised upward from a horizontal position across the front of first stroller portion 12A to a vertical position. Such operation is advantageous when a child is placed in or removed from the seating portion 14A.

Figure 8:
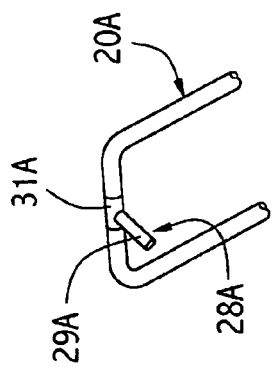
FIG. 8 is a perspective view of one embodiment of the one-handed steering handle.

Referring to FIG. 8, a one-handed steering handle is shown. For simplicity, reference will be made to steering handle 28A of the first stroller portion 12A, with the understanding that the steering handle 28B of the second stroller portion 12B is of similar design. Steering handle 28A is adjustably secured to the upper frame portion 20A of the frame 18A. The upper frame portion 20A may also be used as a handle to operate the stroller 10. In one embodiment, the steering handle 28A comprises a stem 29 and a tube portion 31A which wraps around the upper frame portion 20A. The steering handle may be adjustably secured to the upper frame portion 20A in several ways. In one embodiment, the interior of tube 31A is provided with a set of ridges on the internal surface, which mate with ridges on the external surface of the upper frame portion 20A. The interaction of the complementary ridge portions ensure that the handle remains in a selected position, but allow the user to apply sufficient force to adjust the steering handle 28A to the desired position. Alternatively, the upper frame portion 20A may be provided with a plurality of holes that interact with a knob, protrusion or similar device on the interior of tube 31A. A button or the like may be placed on the stem 29A that reversibly moves the knob between an extended and retracted position. When the button is depressed the knob may be retracted so that is does not engage one of the plurality of holes on the upper frame portion 20A, allowing the user to adjust the handle. When the button is released, the knob is extended and may extend into one of said holes and lock the steering handle 28A in place. The two embodiments described above may also be combined if desired. Other embodiments for moveably securing the steering handle 28A may also be envisioned and should be considered within the scope of this disclosure as the exact mechanism is not critical to the present disclosure.

Figure 9A:
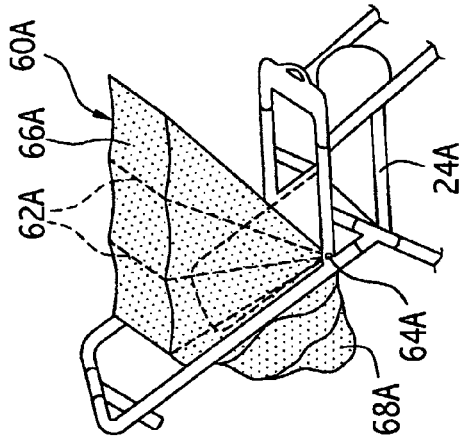
FIG. 9A is a side perspective view of one embodiment of the rotating awning.
Figure 9B:
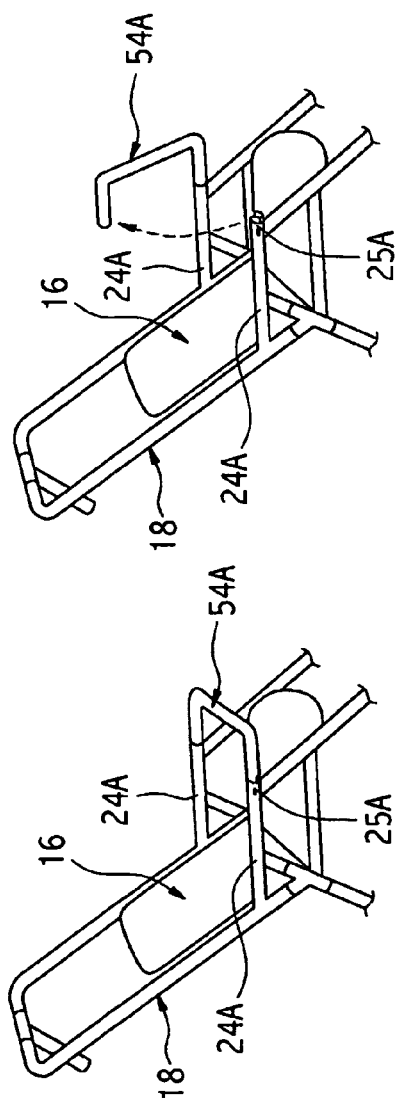
FIG. 9B is a front perspective view of one embodiment of the toy bar attached to the interior of awning.

Referring to FIGS. 9A and 9B, an extendable awning is shown. For simplicity, reference will be made to the extendable awning 60A of the first stroller portion 12A, with the understanding that the extendable awning 60B of the second stroller portion 12B is of similar design. Extendable awning 60A comprises a plurality of frames 62A that are each pivotally attached to the armrests 24A at a central point 64A. Fabric 66A is extended between and joined to the frames 62A to form the completed awning 60A. The awning 60A may be extended to an open position or collapsed to a closed position. The awning 60A may also be removable. An additional fabric portion 68A may be attached to the rear of the awning 60A to permit full coverage of the child when reclined in the first stroller portion 12A. Referring to FIG. 9B, a toy bar 70A is shown. The toy bar 70A may be attached to rings 72A which are located at a plurality of positions on the interior side of the awning 60A. Therefore, the height and position of the toy bar may be altered to suit the position of the child in the first stroller portion 12A.

When the first 12A and the second 12B stroller portions are reversible coupled in the tandem mode, the rear wheels 40B of the second stroller portion 12B will be in a swivel mode allowing the pivot point of the stroller to be in mid-section of tandem where the front wheels 38B of the second stroller portion and the rear wheels 40A of the first stroller portion are aligned. In a tandem mode, the front wheels 38B and the back wheels 40A are not able to swivel or pivot. As discussed above, such an arrangement allows for easier maneuverability of the stroller while in tandem mode. The front wheels 38A of the first stroller portion are also in swivel mode, meaning they are free to pivot.

When the first 12A and second 12B stroller portions are used independently of one another, the rear wheels 40A and 40B will be disengaged from swivel mode as is known in the art allowing the rear wheels 40A and 40B to be the pivot point of the first 12A and second 12B stroller portions. In the independent mode of operation, the front wheels 38A and 38B of the first 12A and second 12B stroller portions will be in swivel mode. In an alternate embodiment, where the first 12A and second 12B stroller portions are identical (and therefore interchangeable), the rear wheels 40A and 40B of the first 12A and second 12B stroller portions will be designed to switch from swivel mode to non-swivel mode as dictated by the mode of operation. Means to switch wheels from swivel to non-swivel mode are known in the art.

In the one embodiment, the first 12A and second 12B stroller portions will be foldable. Means to manufacture the first 12A and second 12B stroller portions in a manner in which they can be folded is known in the art. In an alternate embodiment the first 12A and second 12B stroller portions will not be foldable.

Other methods to reversible couple the first 12A and the second 12B stroller portions to one another may also be envisioned. In one such alternate embodiment, the front wheels 38B of the second stroller portion 12B can be lifted up to "piggy-back" and be reversibly secured to a platform 90A at the rear of the first stroller portion 12A. In this configuration, the front wheels 38B of the second stroller portion 12B are not in contact with the ground. In this embodiment, the rear wheels 40A of the first stroller portion 12A serve as the pivot point. This arrangement will allow the seating area 14B to be tilted (the seating area 14B may be equipped with a tilting mechanism to compensate for the tilt if desired). In yet another alternate embodiment, the front wheel forks 34B with the attached front wheels 38B of the second stroller portion 12B may be removed from the front wheel strut 30B or rotated up at a pivot before being reversible secured to the platform 90B at the rear of the first stroller portion 12A. In this embodiment, the angle of the second stroller portion 12B is not changed. Therefore, the seating area 14B of the second stroller portion 12B is not tilted. The platform 90A can be located between, above, behind or in front of the rear wheels 40A of the first stroller portion 12A. The platform 90A may have straps, indentations, clamps or other means to secure the front wheels 38B to the platform 90A.

In a further alternate embodiment, the rear wheels 40A of the first stroller portion 12A may be lifted up to "piggy-back" and be reversibly secured to a platform 90B at the front of the second stroller portion 12B. In this configuration, the rear wheels 40A of the first stroller portion 12A are not in contact with the ground. In this embodiment, the front wheels 38B of the second stroller portion 12B serve as the pivot point. This arrangement will allow the seating area 14A of the first to be to be tilted the seating area 14A may be equipped with a tilting mechanism to compensate for the tilt if desired). In yet another alternate embodiment, the rear wheel fork 36A with attached rear wheels 40A of the first stroller portion 12A may be removed from the rear wheel strut 32A or rotated up at a pivot before being reversible secured to the platform 90B at the front of the second stroller portion 12B. In this embodiment, the angle of the first stroller portion 12A is not changed. Therefore the seating area 14A of the first stroller portion 12A is not tilted. The platform 90B can be located between, above, behind or in front of the front wheels 38B of the second stroller portion 12B.

Figure 10A:
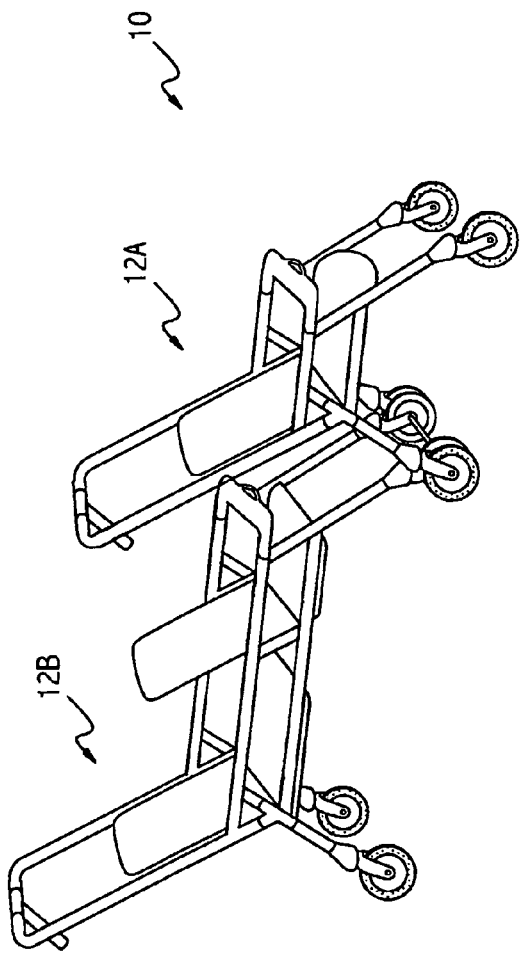
FIG. 10A illustrates an embodiment of the stroller, in the coupled configuration, where the first stroller portion is a single stroller and the second stroller portion is a double stroller.
Figure 10B:
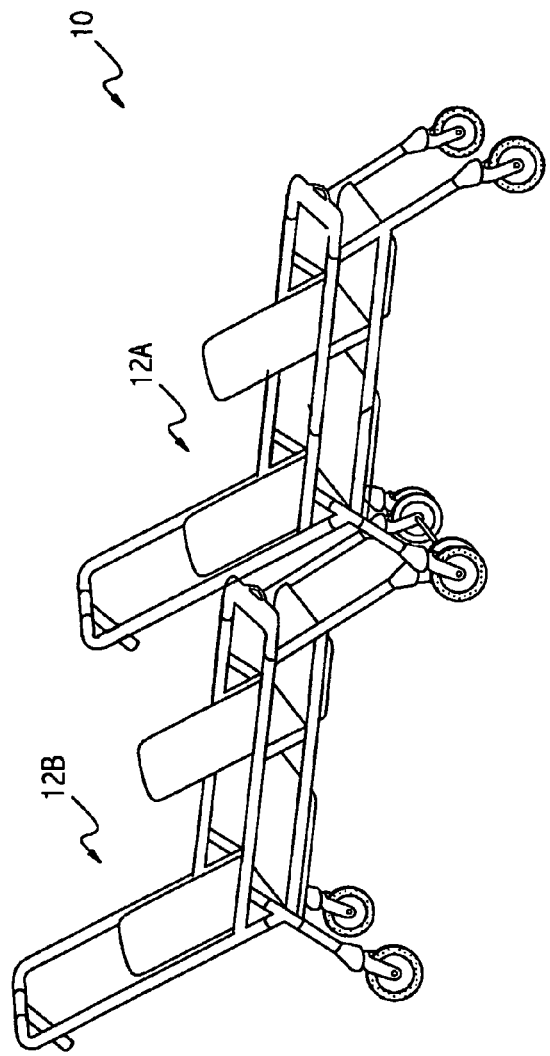
FIG. 10B illustrates an embodiment of the stroller, in the coupled configuration where both the first and second stroller portions are double strollers.

FIGS. 10A and 10B show an embodiment of the stroller of the present disclosure capable of transporting 3 and 4 children respectively. In FIG. 10A, the first stroller portion 12A is illustrated as a single stroller, while the second stroller portion 12B is illustrated as a double stroller. The various descriptions of the first 12A and second 12B stroller portions, as well as the various embodiments for the means for coupling and alignment mechanism are applicable to the embodiment shown in FIG. 10A. Alternatively, both the first 12A and second 12B stroller portions maybe double strollers as illustrated in FIG. 10B. The various descriptions of the first 12A and second 12B stroller portions, as well as the various embodiments for the means for coupling and alignment mechanism are applicable to the embodiment shown in FIG. 10B.

While the preferred embodiments of the invention have been described above, it will be recognized and understood that various modifications may be made therein and appended claims are intended to cover all such modifications which may fall within the spirit and scope of the invention.

What is claimed:

1. A modular stroller comprising:
   a. a first stroller portion capable of independent use, said first stroller portion comprising a first frame and at least a pair of rear wheels, each of said rear wheels being mounted on a rear axle portion, said pair of rear wheels having a first wheel span;
   b. a second stroller portion capable of independent use, said second stroller portion comprising a second frame and at least a pair of front wheels, each of said front wheels being mounted on a front axle portion, said pair of front wheels having a second wheel span, said second wheel span being different from said first wheel span, such that said first and second stroller portions are capable of being aligned in a tandem relationship such that the rear axle portions of the first stroller portion are aligned with the front axle portions of the second stroller portion;
   c. a means for coupling in communication with said first and second stroller portions to reversibly secure the first and second stroller portions in said tandem configuration.

2. The stroller of claim 1 where the first wheel span is greater than the second wheel span and the front wheels of the second stroller portion are placed at a position inside of the rear wheels of the first stroller portion such that the rear axle portion of the first stroller portion are aligned with the front axle portions of the second stroller portion.

3. The stroller of claim 2 further comprising an alignment aid to aid in the alignment of the rear axle portions of the first stroller portion and the front axle portions of the second stroller portion.

4. The stroller of claim 3 where the alignment aid comprises an axle catch secured to at least one of the front axle portions of the second stroller portion and an axle extension secured to at least one of the rear axle portions of the first stroller portion, such that said axle catch engages said axle extension when the rear axle portions of the first stroller portion are aligned with the front axle portions of the second stroller portion.

5. The stroller of claim 3 where the alignment aid comprises an axle catch secured to at least one of the rear axle portions of the first stroller portion and an axle extension secured to at least one of the front axle portions of the second stroller portion, such that said axle catch engages said axle extension when the rear axle portions of the first stroller portion are aligned with the front axle portions of the second stroller portion.

6. The stroller of claim 1 where the second wheel span is greater than the first wheel span and the back wheels of the first stroller portion are placed at a position inside of the front wheels of the second stroller portion such that the rear axle portions of the first stroller portion are aligned with the front axle portions of the second stroller portion.

7. The stroller of claim 6 further comprising an alignment aid to aid in the alignment of the rear axle portion of the first stroller portion and the front axle portions of the second stroller portion.

8. The stroller of claim 7 where the alignment aid comprises an axle catch secured to at least one of the front axle portions of the second stroller portion and an axle extension secured to at least one of the rear axle portions of the first stroller portion, such that said axle catch engages said axle extension when the rear axle portions of the first stroller portion are aligned with the front axle portions of the second stroller portion.

9. The stroller of claim 7 where the alignment aid comprises an axle catch secured to at least one of the rear axle portions of the first stroller portion and an axle extension secured to at least one of the front axle portions of the second stroller portion, such that said axle catch engages said axle extension when the rear axle portions of the first stroller portion are aligned with the front axle portions of the second stroller portion.

10. The stroller of claim 4 where the axle catch further comprises a hinged cover to secure the axle extension and where the alignment aid serves as the means for coupling.

11. The stroller of claim 1 where the front and rear axle portions are hollow and the means for coupling is a rod, said rod extending through the hollow front and rear axle portion of the second and first stroller portion.

12. The stroller of claim 11 where said rod further comprises a securing device to maintain said rod in the hollow front and rear axle portion of the first and second stroller portions.

13. The stroller of claim 12 where the securing device comprises a pair of aligned holes on at least one end of said rod, said holes receiving a securing pin.

14. The stoller of claim 12 where the securing device comprises complementary mating element, one of said complementary mating elements being located adjacent to at least on a cap portion, said complementary mating elements engaging one another by snap-fit friction or mating threads.

15. The stroller of claim 14 where the cap portion is a part of the hollow front axle portion, a part of the hollow rear axle portion or a removable cap.

16. The stoller of claim 12 where said rod comprises a hollow outer rod and an inner rod, said inner rod adapted to be inserted in said outer rod and said securing device comprises an expandable member secured to one end of said outer rod and a biasing means, said biasing means in communication with said expendable member and at least one of said inner rod and outer rod, such that the biasing means and the inner rod allow the expendable member to alternate between a first position and a second position depending on the position of the inner and outer rods, said first position allowing the rod to be inserted through the front and rear axle portions of the first and second stroller portions and said second position allowing the rod to be maintains within the hollow front and rear axle portions of the first and second stroller portions.

17. The stroller of claim 1 where the means for coupling comprises a receiving latch and an axle nub, said receiving latch being of a generally U-shaped configuration, said receiving latch being located on at least one of the rear axle portions of the second stroller portion, such that said receiving latch receives said axle nub when the rear axle portions of the first stroller portion are aligned with the front axle portions of the second stroller portion.

18. The stroller of claim 1 where the means for coupling comprises a receiving latch and an axle nub, said receiving latch being of a generally U-shaped configuration, said receiving latch being located on at least one of the front axle portions of the second stroller portion and said axle nub being located on at least one of the rear axle portions of the first stroller portion, such that said receiving latch receives said axle nub when the rear axle portions of the first stroller portion are aligned with the front axle portions of the second stroller portion.

19. The stroller of claim 17 where the receiving latch comprises a hinged cover to further secure said axle nub.

20. The stroller of claim 1 where the means for coupling comprises a retractable element located in at least one of the front axle portions of the second stroller portion, a receiving aperture located on at least one of the rear axle portions of the first stroller portion and an alternating mechanism capable of alternating the position of the retractable element between a retracted and an extended position, said retractable element extending into the receiving aperture when the retractable element is in the extended position such that said first and second stroller portions are reversible coupled together.

21. The stroller of claim 20 where the retractable element is a retractable pin.

22. The stroller of claim 1 where the means for coupling comprises a retractable element located in at least one of the rear axle portions of the first stroller portion, a receiving aperture located on at least one of the front axle portions of the second stroller portion and an alternating mechanism capable of alternating the position of the retractable element between a retracted and an extended position, said retractable element extending into the receiving aperture when the retractable element is in the extended position such that said first and second stroller portions are reversible coupled together.

23. The stroller of claim 22 where the retractable element is a retractable pin.

24. The stroller of claim 1 where the front and rear axle portions are hollow and the means for coupling comprises a first rod and a second rod, said first rod extending through the hollow front and rear axles portions of a first set of said front and rear wheels to secure said first set of wheels, and said second rod extending through the hollow front and rear axles portions of a second set of said front and rear wheels to secure said second set of wheels.

25. The stroller of claim 1 where the means for coupling comprises at least one bar in communication with the first and second stroller portions.

26. The method of claim 25 where the at least one bar is pivotally secured to at least one of the first or second stroller portions.

27. The stroller of claim 25 where the at least one bar is collapsible.

28. The stroller of any of the preceding claims further comprising a securing strap in communication with said first and second stroller portions.

29. The stroller of claim 1 wherein the first and second stroller portions are not identical in structure.

30. The stroller of claim 1 wherein the first and second stroller portions are identical in structure.

31. The stroller of claim 1 where the first stroller portion is a single stroller or a double stroller and the second stroller portion is a single stroller or a double stroller.

32. The stroller of claim 1 where each of the first stroller portion further comprise a first bar portion, said first bar portion being hingedly connected to said first frame at a first point and releasably connected to said first frame at a second point such that the first bar portion can alternate between a horizontal locked position and a vertical unlocked position and the second stroller portion further comprise a second bar portion, said second bar portion being hingedly connected to said second frame at a first point and releasably connected to said second frame at a first point and releasably connected to said second frame at a second point such that the second bar portion can alternate between a horizontal locked position and a vertical unlocked position.

33. The stroller of claim 1 wherein at least one of the first and second stroller portions are foldable.

34. The stroller of claim 5 where the axle catch further comprises a hinged cover to secure the axle extension and where the alignment aid serves as the means for coupling.

35. The stroller of claim 8 where the axle catch further comprises a hinged cover to secure the axle extension and where the alignment aid serves as the means for coupling.

36. The stroller of claim 9 where the axle catch further comprises a hinged cover to secure the axle extension and where the alignment aid serves as the means for coupling.

37. The stroller of claim 18 where the receiving latch comprises a hinged cover to further secure said axle nub.

38. A modular stroller comprising:
   a. a first stroller portion capable of independent use, said first stroller portion comprising a first frame and at least a pair of rear wheels and having a first wheel span;
   b. a second stroller portion capable of independent use, said second stroller portion comprising a second frame and at least a pair of front wheels having a second wheel span, said second wheel span being different from said first wheel span, such that said first and second stroller portions are capable of being aligned in a tandem relationship such that the rear wheels of the first stroller portion are aligned with the front wheels of the second stroller portion;
   c. a coupling mechanism in communication with said first and second stroller portions to reversibly secure the first and second stroller portions in said tandem configuration.

39. A modular stroller comprising:
   a. a first stroller portion capable of independent use, said first stroller portion comprising a first frame and at least one rear wheel with a first lateral position relative to the first frame;
   b. a second stroller portion capable of independent use, said second stroller portion comprising a second frame and at least one front wheel with a second lateral position relative to said second frame, said second lateral position being different than said first lateral position such that said first and second stroller portions are capable of being aligned in a tandem relationship, such that said at least one front wheel is laterally aligned with said at least one rear wheel;
   c. a coupling mechanism in communication with said first and second stroller portions to reversibly secure the first and second stroller portions in said tandem configuration.

* * * * *